US012562480B2

(12) United States Patent
Hamabe

(10) Patent No.: US 12,562,480 B2
(45) Date of Patent: Feb. 24, 2026

(54) ANTENNA DEVICE AND COMMUNICATION DEVICE

(71) Applicant: Panasonic Intellectual Property Management Co., Ltd., Osaka (JP)

(72) Inventor: Taichi Hamabe, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 229 days.

(21) Appl. No.: 18/207,867

(22) Filed: Jun. 9, 2023

(65) Prior Publication Data

US 2023/0402752 A1 Dec. 14, 2023

(30) Foreign Application Priority Data

Jun. 10, 2022 (JP) ................................ 2022-094690

(51) Int. Cl.
*H01Q 9/04* (2006.01)
*H01Q 1/50* (2006.01)
*H01Q 5/35* (2015.01)
*H01Q 7/00* (2006.01)

(52) U.S. Cl.
CPC ................ *H01Q 5/35* (2015.01); *H01Q 1/50* (2013.01); *H01Q 7/00* (2013.01)

(58) Field of Classification Search
CPC .. H01Q 5/35; H01Q 1/50; H01Q 7/00; H01Q 5/371; H01Q 21/28
See application file for complete search history.

(56) References Cited

U.S. PATENT DOCUMENTS

| | | | | |
|---|---|---|---|---|
| 7,683,843 B2 * | 3/2010 | Laubner | H01Q 1/38 343/711 |
| 9,871,297 B2 * | 1/2018 | Kitchener | H01Q 13/18 |
| 10,784,578 B2 * | 9/2020 | Chou | H01Q 1/521 |
| 2007/0024513 A1 * | 2/2007 | Sako | H01Q 21/28 343/730 |
| 2007/0229366 A1 * | 10/2007 | Kim | H01Q 9/42 343/846 |
| 2008/0174505 A1 * | 7/2008 | Wong | H01Q 5/25 343/795 |

(Continued)

FOREIGN PATENT DOCUMENTS

| | | |
|---|---|---|
| CN | 105591190 | 5/2016 |
| CN | 103811864 | 8/2016 |

(Continued)

OTHER PUBLICATIONS

Extended European Search Report issued Oct. 11, 2023 in corresponding European Patent Application No. 23159852.5.

*Primary Examiner* — Dimary S Lopez Cruz
*Assistant Examiner* — Bamidele A Immanuel
(74) *Attorney, Agent, or Firm* — Wenderoth, Lind & Ponack, L.L.P.

(57) ABSTRACT

There are provided an antenna device and a communication device including: a feed antenna connected to a feed point; a loop antenna connected to ground and arranged to surround the feed antenna; and two resonators provided inside the loop antenna and on both sides of the feed antenna in a short direction of the feed antenna. Each of the two resonators is connected to the loop antenna and has an L shape.

6 Claims, 8 Drawing Sheets

(56) References Cited

U.S. PATENT DOCUMENTS

| | | | | |
|---|---|---|---|---|
| 2009/0237319 | A1* | 9/2009 | Fukushima | H01Q 9/24 343/793 |
| 2011/0025570 | A1* | 2/2011 | Sakuma | H01Q 1/523 343/749 |
| 2011/0287731 | A1* | 11/2011 | Hase | H01Q 9/30 343/727 |
| 2012/0068898 | A1 | 3/2012 | Clow et al. | |
| 2013/0285869 | A1* | 10/2013 | Chung | H01Q 19/104 343/835 |
| 2014/0232608 | A1* | 8/2014 | Zhao | H01Q 5/40 343/866 |
| 2015/0077307 | A1* | 3/2015 | Liou | H01Q 7/00 343/866 |
| 2015/0295311 | A1* | 10/2015 | Bringuier | H01Q 1/521 343/729 |
| 2015/0349425 | A1* | 12/2015 | Kitchener | H01Q 9/045 343/860 |
| 2016/0301140 | A1* | 10/2016 | Du | H01Q 5/392 |
| 2017/0256843 | A1* | 9/2017 | Hu | H01Q 21/28 |
| 2017/0256854 | A1* | 9/2017 | Hu | H01Q 9/40 |
| 2017/0309990 | A1* | 10/2017 | Shih | H01Q 7/00 |
| 2018/0076505 | A1* | 3/2018 | Hu | H01Q 21/28 |
| 2018/0183145 | A1* | 6/2018 | Izawa | H01Q 21/28 |
| 2020/0106178 | A1* | 4/2020 | Chou | H01Q 1/2291 |
| 2020/0196439 | A1* | 6/2020 | Hamabe | H05K 1/0253 |
| 2021/0021045 | A1* | 1/2021 | Hamabe | H01Q 1/48 |
| 2021/0111486 | A1* | 4/2021 | Tamrakar | H01Q 1/2266 |
| 2021/0167504 | A1* | 6/2021 | Yu | H01Q 9/045 |
| 2023/0163466 | A1* | 5/2023 | Yu | H01Q 1/521 343/702 |
| 2023/0187827 | A1* | 6/2023 | Sokolov | H01Q 5/35 343/893 |

FOREIGN PATENT DOCUMENTS

| | | |
|---|---|---|
| JP | 2012-529830 | 11/2012 |
| WO | 2021/213125 | 10/2021 |

* cited by examiner

ANTENNA DEVICE AND COMMUNICATION DEVICE

CROSS-REFERENCE TO RELATED APPLICATIONS

This application is based on and claims priority under 35 USC 119 from Japanese Patent Application No. 2022-094690 filed on Jun. 10, 2022, the contents of which are incorporated herein by reference.

TECHNICAL FIELD

The present disclosure relates to an antenna device and a communication device.

BACKGROUND ART

In the related art, it is required to extend a frequency that can be supported by an antenna to a frequency in a wider band. For example, in Wi-Fi 6 among Wi-Fi (registered trademark) which is a wireless communication technology in the related art, an antenna capable of supporting a 2400 MHz band and a 5000 MHz band is known. JP2012-529830A discloses a configuration for providing, with a compact configuration, an antenna capable of supporting an ultra-wideband (UWB) frequency band including a frequency band higher than the 5000 MHz band.

SUMMARY OF INVENTION

The present disclosure provides an antenna device capable of supporting an ultra wideband and reducing the size.

According to an illustrative aspect of the present disclosure, an antenna device includes: a feed antenna connected to a feed point; a loop antenna connected to ground and arranged to surround the feed antenna; and two resonators provided inside the loop antenna and on both sides of the feed antenna in a short of direction the feed antenna. Each of the two resonators is connected to the loop antenna and has an L shape.

According to another illustrative aspect of the present disclosure, a communication device includes the above antenna device.

Any combination of the above components or a conversion on the expression of the present disclosure between devices, systems, or the like is also effective as an aspect of the present disclosure.

According to the present disclosure, it is possible to provide an antenna device capable of supporting an ultra wideband and reducing the size.

DESCRIPTION OF EMBODIMENTS

Background of Present Disclosure

In the related art, an antenna device capable of supporting a plurality of frequency bands is known. For example, in Wi-Fi (registered trademark) which is one of wireless communication technologies, there is an antenna device including a configuration capable of supporting two frequency bands including a 2 GHz band and a 5 GHz band. In addition, an antenna device applicable to a frequency band higher than the 5 GHz band is required.

The number of elements constituting the antenna device increases in accordance with extension of the frequency band. Therefore, in order to support a wider frequency band, it is required to compact the antenna size while sharing the elements in the antenna device as much as possible. In addition, there is also a problem that when an antenna device applicable to a band including a higher frequency band is configured using, for example, a general dipole antenna, a fractional bandwidth becomes about 10%, and when an antenna device is configured by a micro strip line (MSL) antenna, the fractional bandwidth becomes about 0.5%, and a band that can be supported becomes narrow. Even when a method of extending the fractional bandwidth by increasing the number of resonance points using a parasitic element or the like at the time of broadening the bandwidth is used, the fractional bandwidth is about 20%.

Hereinafter, embodiments specifically disclosing an antenna device and a communication device according to the present disclosure will be described in detail with reference to the accompanying drawings as appropriate. An unnecessarily detailed description may be omitted. For example, a detailed description of a well-known matter or a repeated description of substantially the same configuration may be omitted. This is to avoid unnecessary redundancy in the following description and to facilitate understanding of those skilled in the art. The accompanying drawings and the following description are provided for those skilled in the art to fully understand the present disclosure, and are not intended to limit the subject matter described in the claims.

First Embodiment

In a first embodiment to be described below, an antenna device capable of performing wireless communication conforming to a wireless local area network (LAN) standard such as Wi-Fi (registered trademark) will be described as an example. In particular, in addition to a frequency band of a 5 GHz band (for example, 5150 MHz to 5800 MHz), a higher frequency band of a 7 GHz band (for example, 5900 MHz to 7150 MHz) will be described. The antenna device is not limited to the above standard, and may be applied to wireless communication in a frequency band conforming to another standard.

[Device Configuration]

Figure 1:
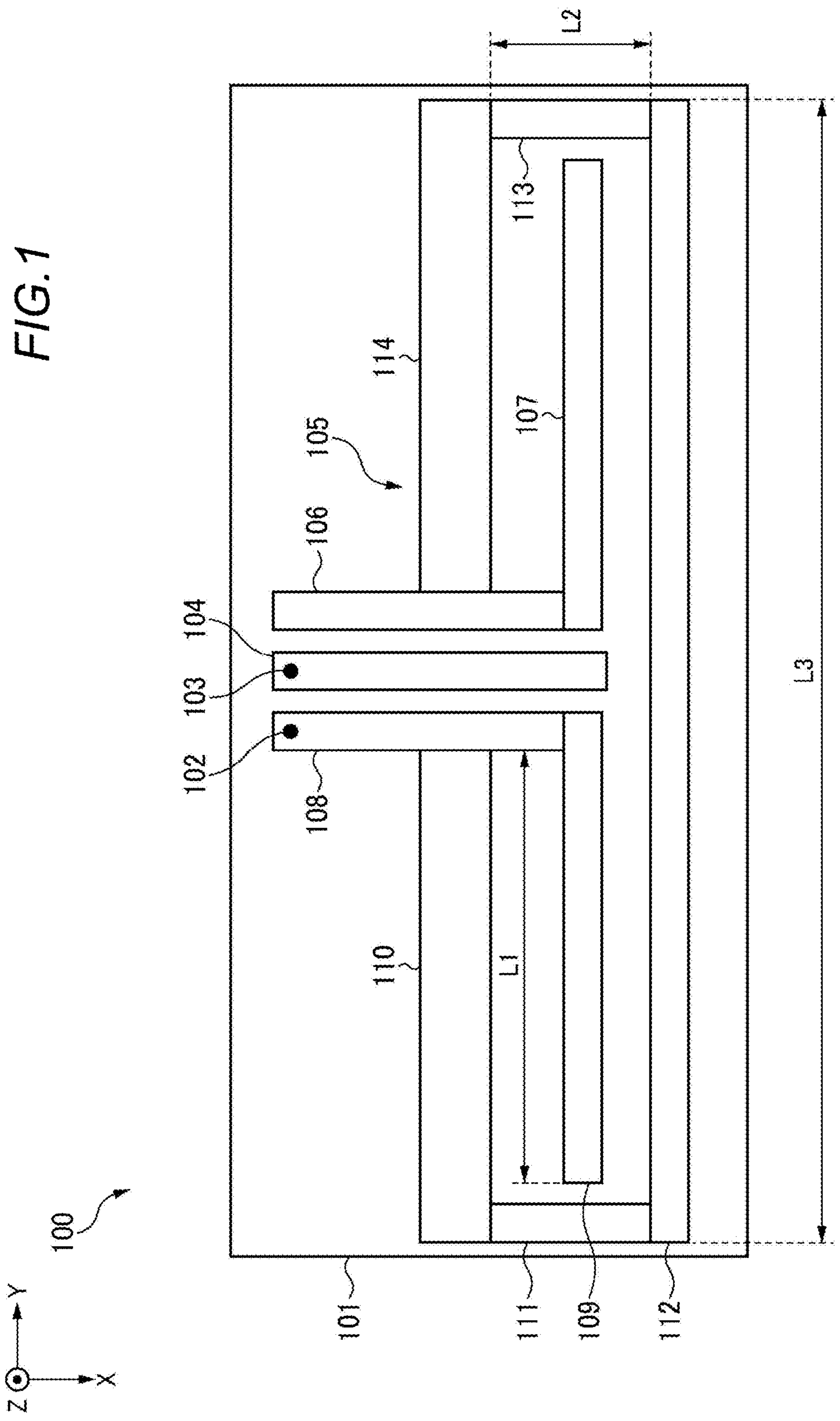
FIG. 1 is a diagram showing a configuration example of an antenna device according to a first embodiment.

FIG. 1 is a schematic diagram showing a configuration example of an antenna device 100 according to the present embodiment. In FIG. 1, an X axis corresponds to a short direction of aboard 101 on which the antenna device 100 is configured. A Y axis corresponds to a longitudinal direction of the board 101 on which the antenna device 100 is configured. AZ axis corresponds to a thickness direction of the board 101 of the antenna device 100.

The antenna device 100 is mounted on, for example, a communication device (not shown) capable of using wireless communication of Wi-Fi (registered trademark). Therefore, the communication device can perform wireless communication with another communication device using the antenna device 100 in a plurality of frequency bands including the 5 GHz band and the 7 GHz band.

The board 101 of the antenna device 100 according to the present embodiment has a rectangular shape. The shape and the size of the board 101 are not particularly limited, and are desired to be a shape and size in consideration of dimensions of elements to be described later. The board 101 may be a laminated board including a plurality of layers.

In the antenna device 100 according to the present embodiment, portions constituting the antenna are formed on a printed wiring board which is a laminated board including a plurality of layers, and a pattern is formed by etching a metal foil on the surface. Each of the plurality of layers may be made of, for example, copper foil, glass epoxy, or the like.

The board 101 includes an antenna conductor 104 as an example of a feed antenna and an antenna conductor 105 as an example of a parasitic antenna. The antenna conductor 104 is provided with a feed point 103 for feeding. The feed point 103 is connected to a power source (not shown) via, for example, a conductive wire (not shown). The antenna conductor 105 is provided with a ground point 102 for connecting (short-circuiting) to the ground (GND). The ground point 102 is connected to a ground level via, for example, a conductive wire (not shown). The conductive wires connected to the ground point 102 and the feed point 103 may be included in one coaxial cable (not shown).

Details will be described later, and in the present embodiment, for the 7 GHz band, which is an example of a first frequency, resonance is caused by a loop antenna including the antenna conductor 105. For the 5 GHz band, which is an example of a second frequency lower than the first frequency, resonance is caused by a T-shaped antenna and a slot antenna of the antenna conductor 105. On the other hand, dimensions of the portions constituting the antenna are defined to support these frequency bands.

The antenna conductor 104 extends from the feed point 103 along an X-axis direction.

The antenna conductor 105 includes a portion constituting the loop antenna that is arranged so as to surround the antenna conductor 104, and a portion constituting the T-type antenna inside the portion of the loop antenna. The portion constituting the loop antenna includes element portions 108, 110, 111, 112, 113, 114, and 106 in a counterclockwise direction from the element portion 108 connected to the ground point 102. In addition, the portion constituting the T-shaped antenna is arranged such that an L-shaped portion including the element portions 106 and 107 and an L-shaped portion including the element portions 108 and 109 sandwich the antenna conductor 104.

The element portions 106, 108, 111, and 113 are configured such that longitudinal directions thereof extend along the X axis. In addition, the element portions 107, 109, 110, 112, and 114 are configured such that longitudinal directions thereof extend along the Y axis.

A length of the element portion 109 in the longitudinal direction from a connection position with the element portion 108 is indicated by L1. A length of the element portion 107 in the longitudinal direction from a connection position with the element portion 106 is also indicated by L1. A length of each of the element portions 111 and 113 in the longitudinal direction is indicated by L2. A length of the element portion 112 in the longitudinal direction is indicated by L3. λ shown below indicates a frequency.

In the present embodiment, L1 is defined as a length for supporting the 5 GHz band. Here, L1 can be configured to be λ/4.

In the present embodiment, L2 and L3 are defined as lengths for supporting the 7 GHz band. Here, L2 can be configured to be λ/4, and L3 can be configured to be λ.

[Resonance]

FIGS. 2A, 2B, 3A, and 3B are diagrams for describing resonance of the antenna device 100 according to the present embodiment in the 5 GHz band and the 7 GHz band.

Figure 2A:
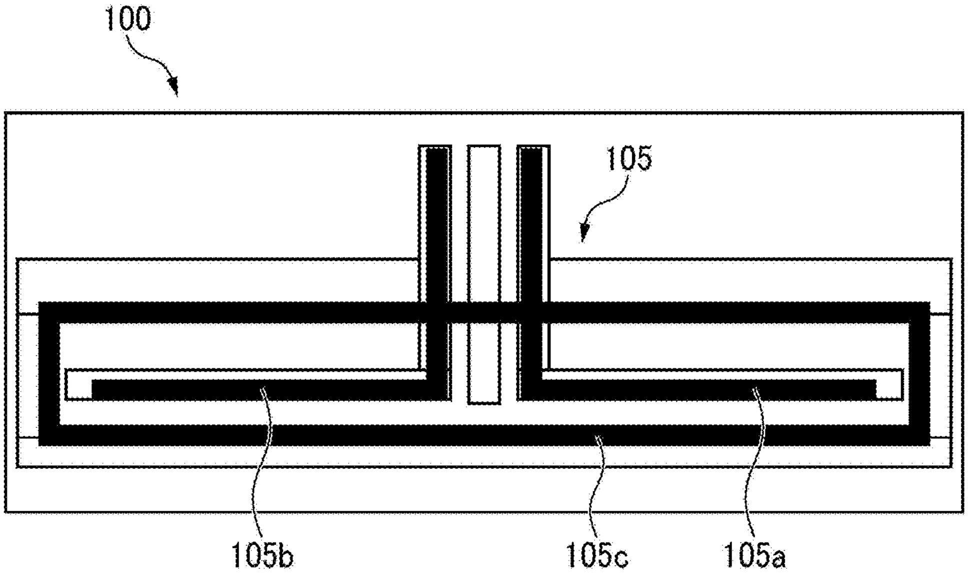
FIGS. 2A and 2B are diagrams for describing an operation of the antenna device according to the first embodiment in a 5 GHz band.
Figure 2B:
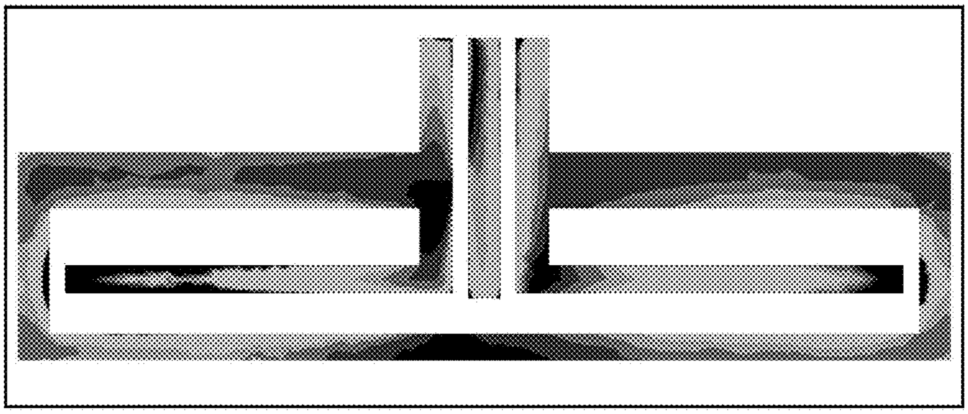

FIGS. 2A and 2B are diagrams for describing resonance in the 5 GHz band. In FIG. 2A, thick lines 105*a* and 105*b* schematically show portions constituting the T-shaped antenna. In addition, thick lines 105*a*, 105*b*, and 105*c* constitute the slot antenna. Resonance is caused by the T-shaped antenna and the slot antenna in the 5 GHz band, and FIG. 2B shows an example of a resonance state by gradation.

Figure 3A:
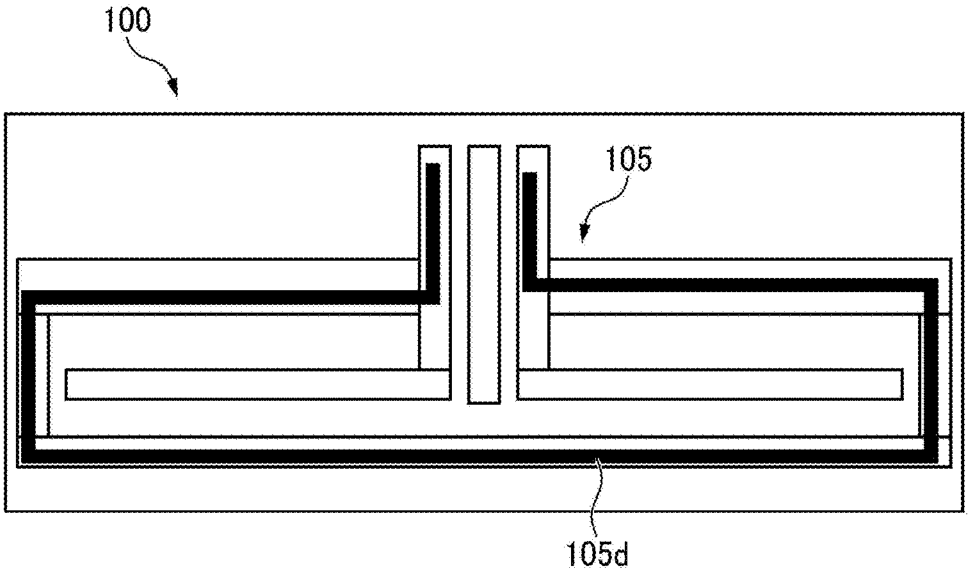
FIGS. 3A and 3B are diagrams for describing an operation of the antenna device according to the first embodiment in a 7 GHz band.
Figure 3B:
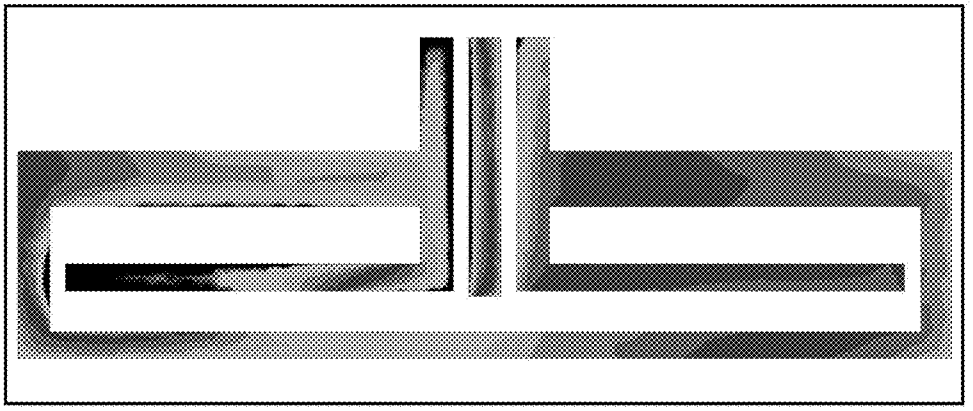

FIGS. 3A and 3B are diagrams for describing resonance in the 7 GHz band. In FIG. 3A, a thick line 105*d* schematically shows a portion constituting the loop antenna. Resonance is caused by the loop antenna in the 7 GHz band, and FIG. 3B shows an example of a resonance state by gradation.

[VSWR Characteristics]

Figure 4:
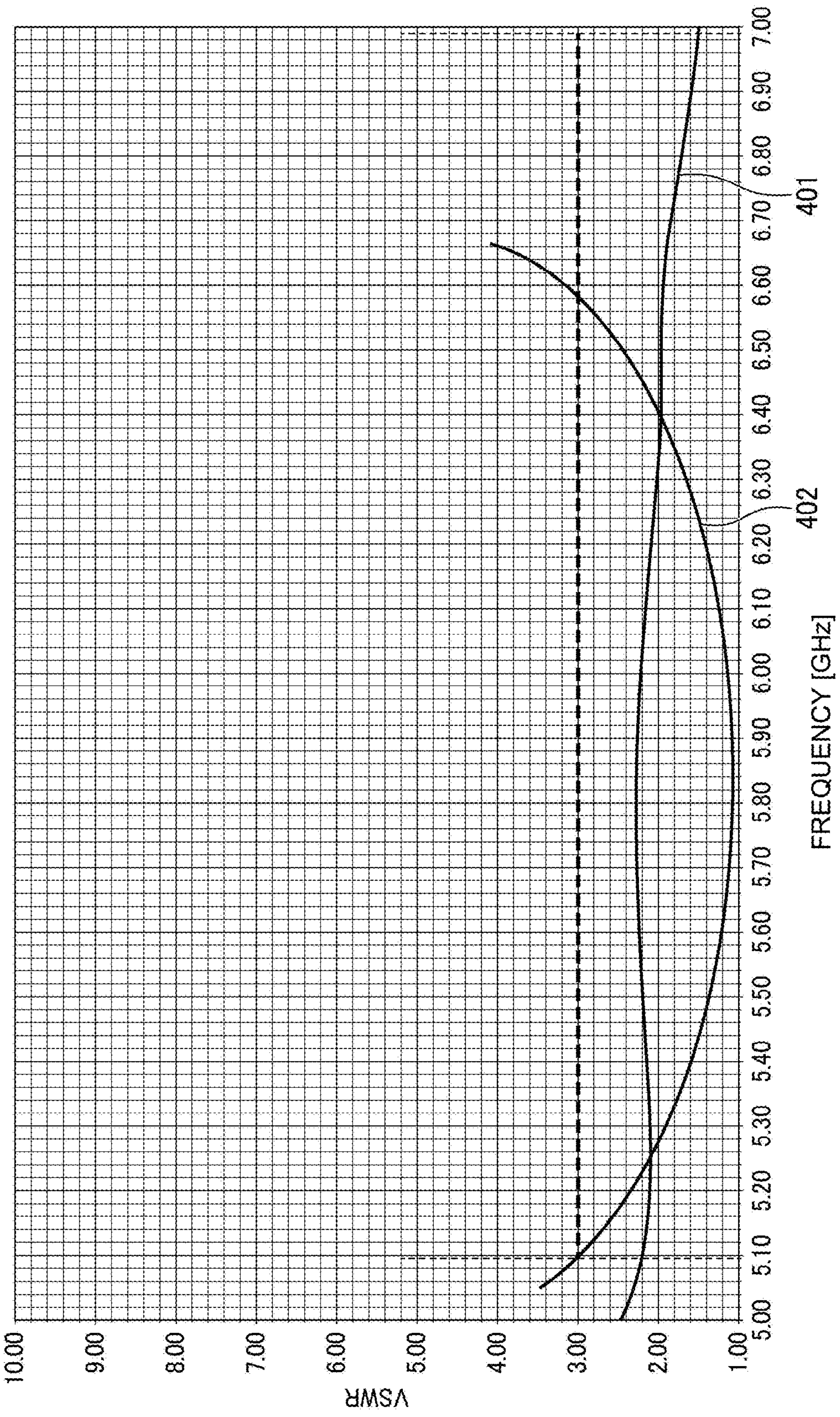
FIG. 4 is a graph showing VSWR characteristics of the antenna device according to the first embodiment.

FIG. 4 is a graph showing voltage standing wave ratio (VSWR) characteristics, in the 5 GHz band and the 7 GHz band, of the configuration of the antenna device 100 according to the present embodiment shown in FIG. 1. In FIG. 4, a horizontal axis indicates frequency [GHz], and a vertical axis indicates VSWR.

A solid line 401 indicates the VSWR of the antenna device 100 according to the present embodiment, and a solid line 402 indicates the VSWR of an antenna device supporting only the 5 GHz band as a comparative example. First, focusing on the VSWR of the configuration in the related art, U-shaped characteristics are shown, and the VSWR shows a value of 3 or less in a range of 5.10 GHz to 6.60 GHz. The value of the VSWR increases toward ends of the range with the bottom around 5.85 GHz. Further, out of the range of 5.10 GHz to 6.60 GHz, the VSWR has a value of 3 or more.

On the other hand, according to the VSWR of the antenna device 100 according to the present embodiment, the VSWR shows a value of 3 or less in a range of 5.00 GHz to 7.00 GHz, and in particular, the VSWR can stably show a value of 3 or less (more specifically, VSWR of 2 or less) even in a range of 6.60 GHz to 7.00 GHz in which a sufficient value cannot be shown in the antenna device in the related art.

Figure 5:
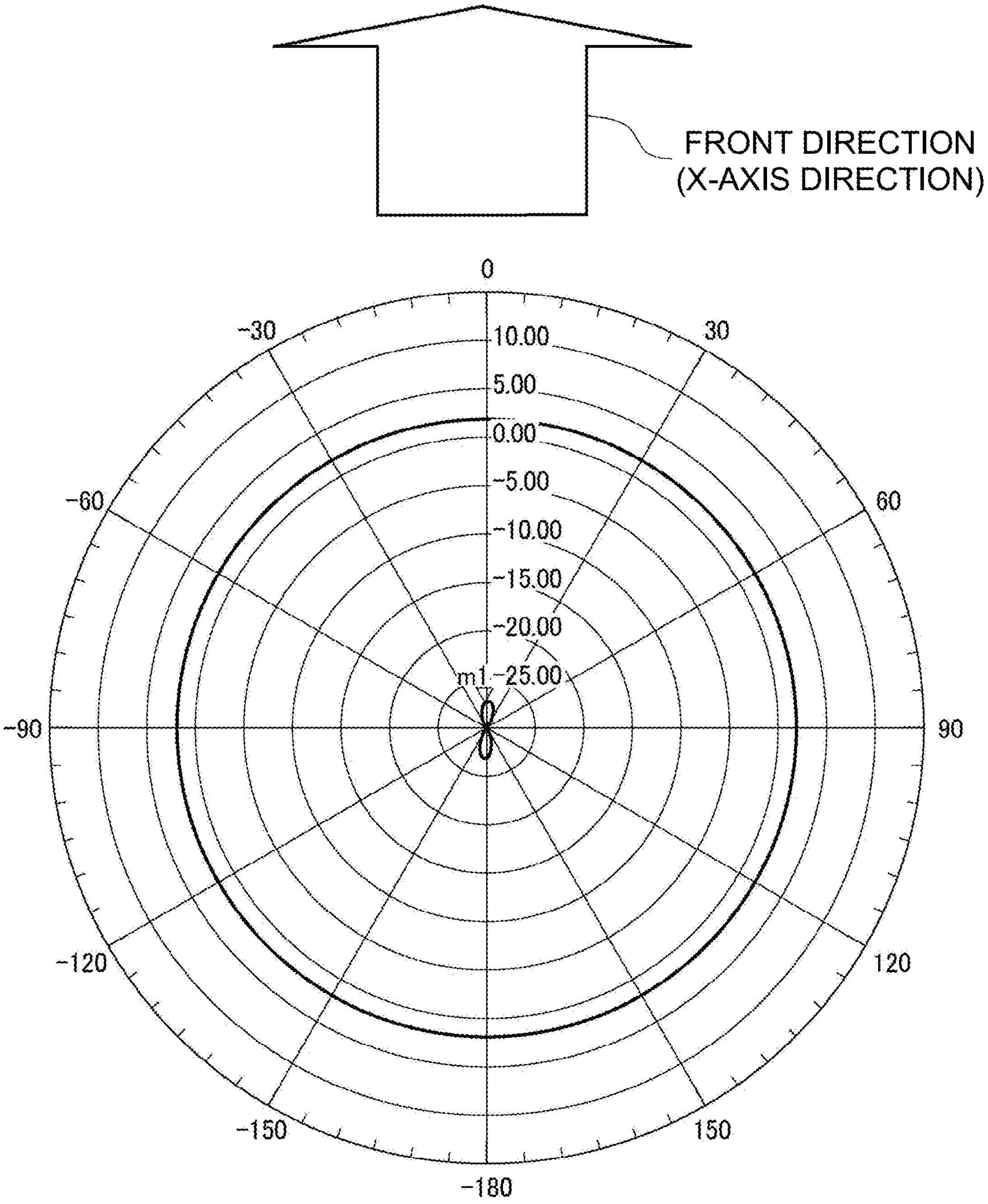
FIG. 5 is a diagram for describing a gain of the antenna device according to the first embodiment.

In addition, FIG. 5 is a diagram showing a gain of the antenna device 100 according to the present embodiment. Here, when the X-axis direction shown in FIG. 1 is a forward direction, directivity of the antenna device 100 according to the present embodiment shows characteristics as shown in FIG. 5.

As described above, according to the present embodiment, the antenna device 100 includes a feed antenna (antenna conductor 104) connected to the feed point 103, a loop antenna (antenna conductor 105) connected to the ground point 102 and arranged so as to surround the feed antenna (antenna conductor 104), and two resonators (element portions 106, 107, 108, and 109) provided inside the loop antenna (antenna conductor 105) and on both sides of the feed antenna (antenna conductor 104) in a short direction. Each of the resonators (element portions 106, 107, 108, and 109) is connected to the loop antenna (antenna conductor 105) and has an L shape.

Accordingly, it is possible to provide an antenna device capable of supporting a wide band and reducing the size.

In addition, an element length of the loop antenna (antenna conductor 105) is a length corresponding to a wavelength of the first frequency (for example, 7 GHz).

Accordingly, the antenna device 100 can support the first frequency which is a higher frequency band.

In addition, in each of the resonators (element portions 106, 107, 108, and 109), an element length of a portion of the L shape extending in the short direction of the feed antenna (antenna conductor 104) is ¼ of a wavelength of the second frequency (for example, 5 GHz band) lower than the first frequency (for example, 7 GHz band).

Accordingly, the antenna device 100 can support a wide band including the first frequency and the second frequency.

In addition, the antenna device 100 can be used by being mounted on various communication devices.

Second Embodiment

A second embodiment of the present invention will be described. In the first embodiment, a configuration in which the antenna device 100 shown in FIG. 1 is configured as one element has been described. In the second embodiment, an embodiment in which desired directivity is implemented by extending the configuration shown in FIG. 1 to two elements will be described.

Figure 6:
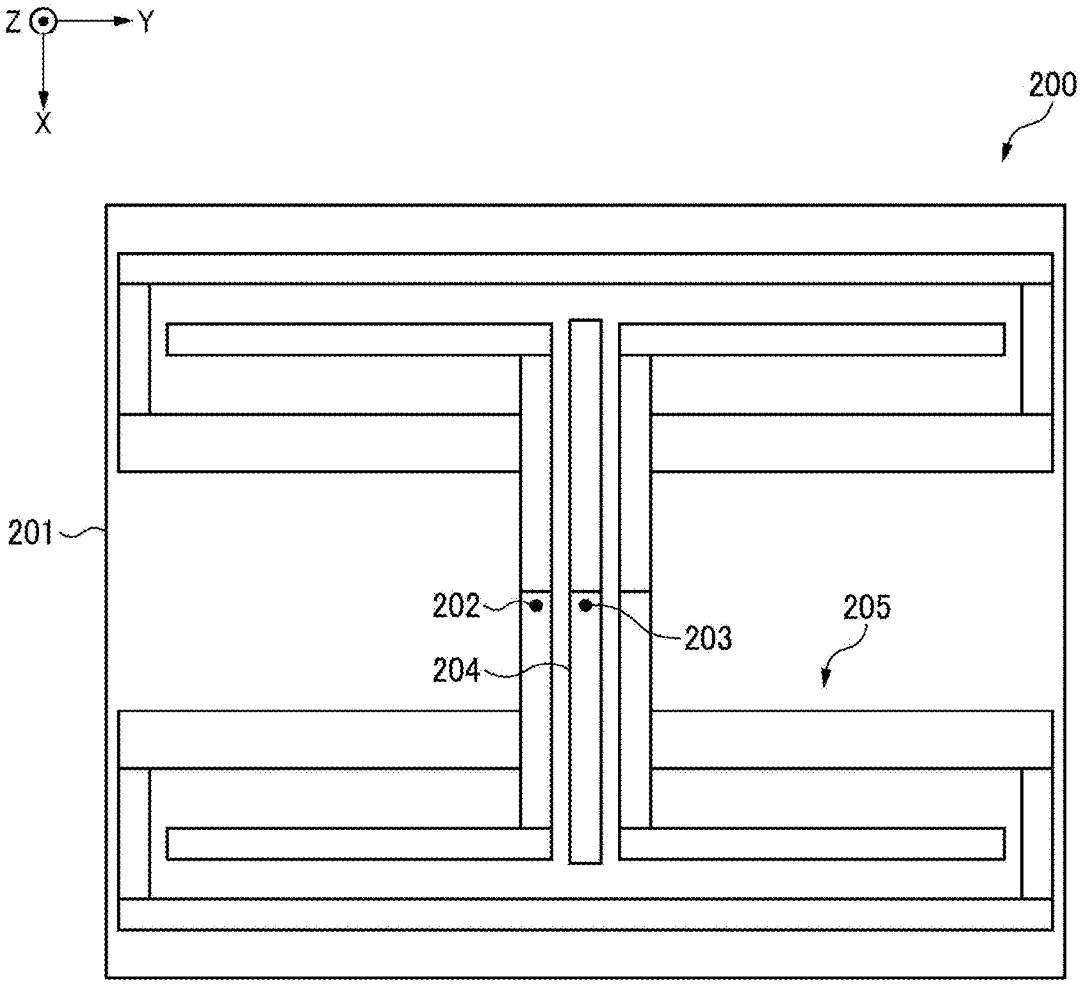
FIG. 6 is a diagram showing a configuration example of an antenna device according to a second embodiment.

FIG. 6 is a schematic diagram showing a configuration example of an antenna device 200 according to the present embodiment. The configuration of the antenna device 200 is a configuration obtained by extending the configuration described with reference to FIG. 1 in the first embodiment to two elements, and the basic configurations are the same. In the present embodiment, even in the case of being extended to two elements, an example is shown in which a ground point 202 and a feed point 203 are configured as one. An antenna conductor 204 is a feed antenna connected to the feed point 203. An antenna conductor 205 is a parasitic antenna connected to the ground point 202.

Figure 7:
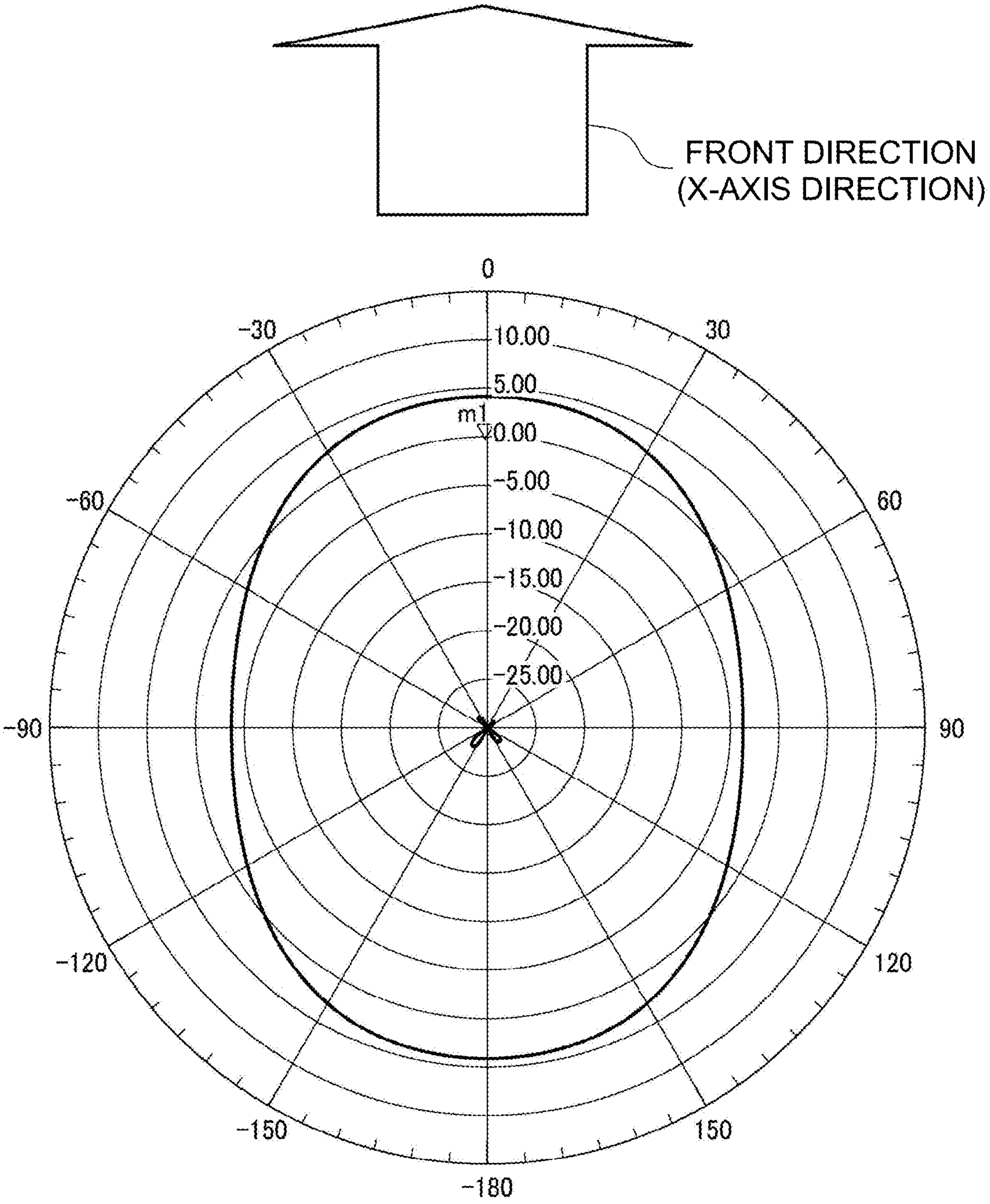
FIG. 7 is a diagram for describing a gain of the antenna device according to the second embodiment.

FIG. 7 is a diagram showing a gain of the antenna device 200 in FIG. 6. Here, when an X-axis direction shown in FIG. 6 is a forward direction, directivity of the antenna device 200 according to the present embodiment shows characteristics as shown in FIG. 7 on a ZX plane. Compared with the gain of the antenna device 100 according to the first embodiment shown in FIG. 5, which includes one element, the directivity characteristics are different.

The directivity of the antenna device 200 shown in FIG. 7 can be further adjusted by adjusting a relative positional relation between the two elements. For example, it is assumed that the antenna device 200 is mounted on a film so as to be bendable. Accordingly, the directivity of the antenna device 200 and an irradiation direction of a signal can be adjusted.

Figure 8C:
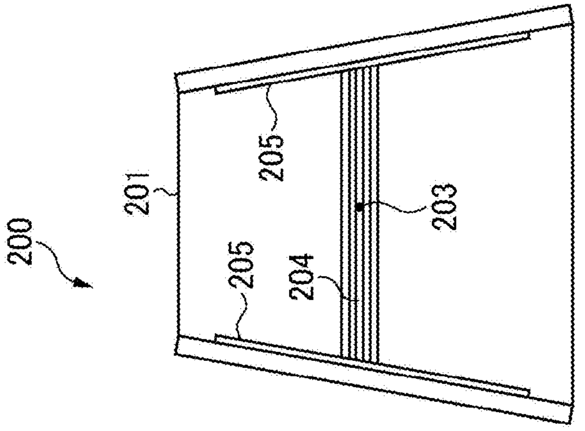
FIGS. 8A, 8B, and 8C are schematic diagrams showing arrangement examples of the antenna device according to the second embodiment.
Figure 8B:
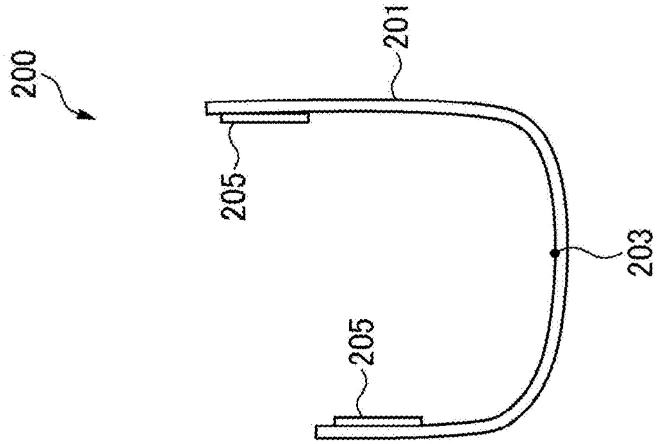
Figure 8A:
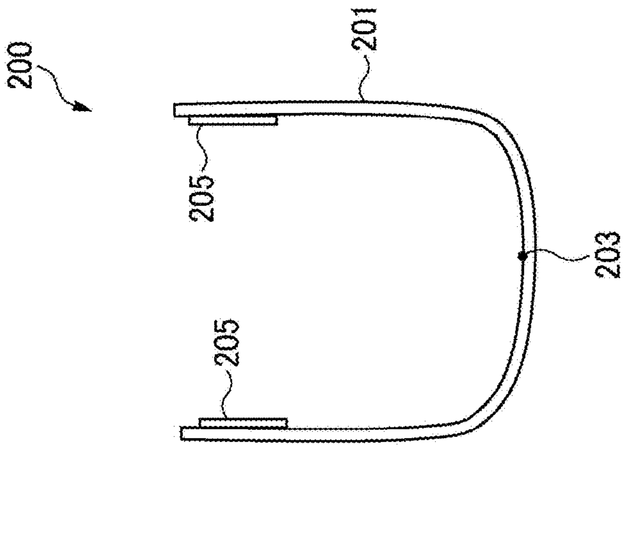

FIGS. 8A, 8B, and 8C are diagrams showing arrangement examples of the antenna device 200. FIG. 8A shows a state in which the antenna device 200 is bent into a U shape and viewed from the side. Here, end portions of the antenna conductor 205, which is a parasitic antenna, are arranged so as to face each other at the same height. In this case, FIG. 8A shows an example in which the feed point 203 is a bottom portion when the antenna device 200 is bent, and is arranged at a center position of both end portions of the antenna conductor 205. That is, the example in FIG. 8A shows an arrangement in which both end portions of the antenna conductor 205 face (directly face) each other so as to be line-symmetrical with respect to the feed point 203.

At this time, an intensity of irradiation in a predetermined direction may be adjusted by adjusting a distance between the end portions of the antenna conductor 205. For example, the closer (narrower) the distance between both end portions of the facing antenna conductor 205 is, the stronger the irradiation intensity to the outside is, and on the other hand, the farther (wider) the distance is, the weaker the irradiation intensity to the outside is.

FIG. 8B shows another example of a state in which the antenna device 200 is bent into a U shape and viewed from the side. Here, the end portions of the antenna conductor 205, which is a parasitic antenna, are arranged at different heights. In this case, FIG. 8B shows an example in which the feed point 203 is a bottom portion when the antenna device 200 is bent, and is arranged at a position other than the center of both end portions of the antenna conductor 205. That is, a feed position is not necessarily limited to the center from both ends of the antenna conductor 205. The example in FIG. 8B shows a configuration example in which both ends of the antenna conductor 205 face each other, but are not in a positional relation directly facing each other. In other words, in the present embodiment, the term “face” is not intended to limit that the respective portions directly face each other.

FIG. 8C shows a state in which the antenna device 200 is bent into a U shape and a bent surface is viewed from above. Here, the end portions of the antenna conductor 205, which is a parasitic antenna, have the same height, but surfaces of the end portions of the antenna conductor 205 are arranged in a truncated-V shape. In this case, FIG. 8C shows an example in which the feed point 203 is a bottom portion when the antenna device 200 is bent, and is arranged at a center position of both end portions of the antenna conductor 205.

In the above examples, examples have been described in which the antenna device 200 is bent such that the surface on which the antenna conductor 205 is formed is on the inner side, but the present invention is not limited thereto. For example, the antenna device 200 may be bent such that the surface on which the antenna conductor 205 is formed is on the outer side. In addition, the shape is not limited to the U shape, and may be a V shape or the like.

In this way, in the antenna device 200 including two elements according to the present embodiment, it is possible to adjust desired directivity and irradiation direction by adjusting the relative positional relation between the two elements. For example, it is possible to adjust a range and a direction in which a signal is irradiated according to a shape of a space in which the antenna device 200 is arranged. Therefore, it is possible to prevent the occurrence of a range in which a radio wave does not reach according to the shape of the space. Examples of the space in which the antenna device 200 is arranged include a space in which the lengths in the front-rear direction and the left-right direction are extremely different from each other, such as the inside of an aircraft.

As described above, according to the present embodiment, the antenna device 200 includes a plurality of antenna elements, and is arranged such that at least a part of surfaces on which the plurality of antenna elements are formed faces one another.

Accordingly, the antenna device 200 can easily implement desired directivity and communication range according to the installation space or the like.

Other Embodiments

Although various embodiments have been described above with reference to the drawings, it is needless to say that the present disclosure is not limited to such examples. It will be apparent to those skilled in the art that various changes, modifications, substitutions, additions, deletions, and equivalents can be conceived within the scope of the claims, and it should be understood that such changes and the like also belong to the technical scope of the present disclosure. Components in the various embodiments described above may be combined optionally in the range without deviating from the spirit of the invention.

In the above embodiments, an example has been described in which the antenna device 100 is mounted in the seat monitor installed in the aircraft. However, the present invention is not limited to the seat monitor, and may be mounted on, for example, many Internet of things (IoT) devices such as a parent device or a child device of a cordless telephone, an electronic shelf label (for example, card-type electronic device which is attached to a display shelf of a retail store and displays a sales price of a product), a smart speaker, an in-vehicle device, a microwave oven, or a refrigerator.

In addition, the antenna device according to the present invention may be applied to, for example, an antenna device dedicated to transmission or reception, in addition to an antenna device capable of transmitting and receiving electromagnetic waves.

What is claimed is:

1. An antenna device comprising:

a first antenna element including:

a first feed antenna connected to a feed point;

a first loop antenna connected to a ground and arranged to surround the first feed antenna; and two first resonators provided inside the first loop antenna and on both sides of the first feed antenna in a short direction of the first feed antenna, each of the two first resonators being connected to the first loop antenna and having an L shape; and a second antenna element including:

a second feed antenna connected to the feed point;

a second loop antenna connected to the ground and arranged to surround the second feed antenna; and two second resonators provided inside the second loop antenna and on both sides of the second feed antenna in a short direction of the second feed antenna, each of the two second resonators being connected to the second loop antenna and having the L shape, wherein the first feed antenna and the second feed antenna are in contact with each other at the feed point.

2. The antenna device according to claim 1, wherein an element length of each of the first and second loop antennas is a length corresponding to a wavelength of a first frequency.

3. The antenna device according to claim 2, wherein in each of the two first resonators, an element length of portions of the first resonators having the L shape is ¼ of a wavelength of a second frequency that is lower than the first frequency, the portions of the first resonators extending in the short direction of the first feed antenna, and in each of the two second resonators, an element length of portions of the second resonators having the L shape is ¼ of the wavelength of the second frequency that is lower than the first frequency, the portions of the second resonators extending in the short direction of the second feed antenna.

4. The antenna device according to claim 3, wherein the first frequency is in a 7 GHz band, and the second frequency is in a 5 GHz band.

5. A communication device comprising:

the antenna device according to claim 1.

6. The communication device according to claim 5, wherein the first and second antenna elements are arranged such that at least a part of a surface on which each of the first and second antenna elements is formed face one another.

* * * * *